W. L. E. KEUFFEL.
SLIDE RULE RUNNER.
APPLICATION FILED NOV. 25, 1913. RENEWED JULY 20, 1915.
1,150,771. Patented Aug. 17, 1915.
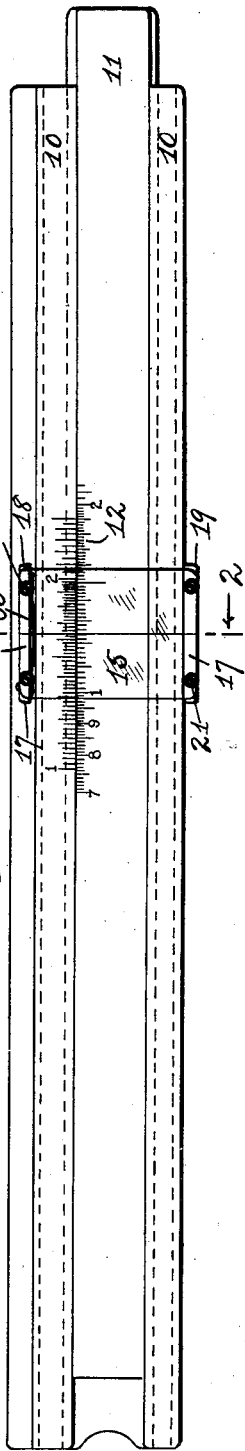
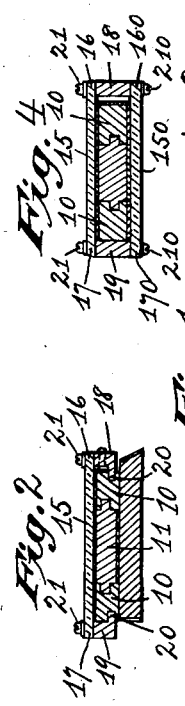
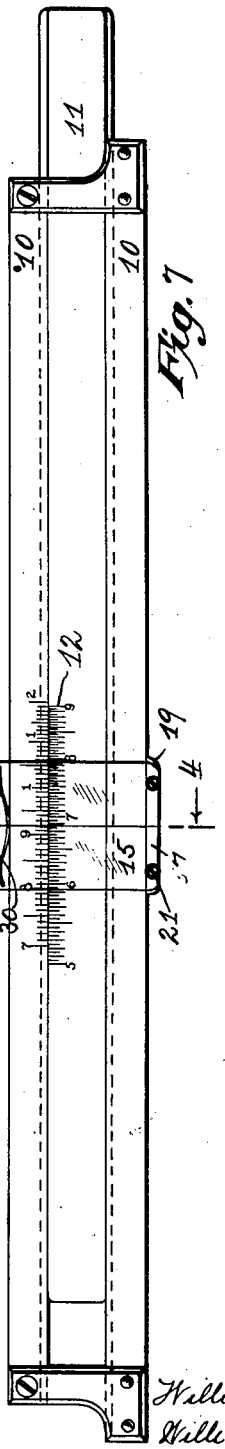
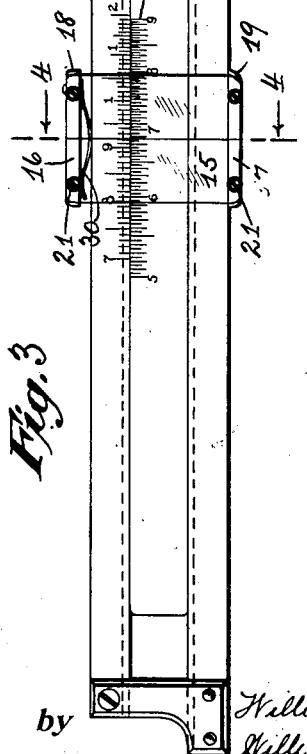
Attest:
Inventor:
Willie L. E. Keuffel
William R. Baird
his Atty

UNITED STATES PATENT OFFICE.

WILLIE L. E. KEUFFEL, OF HOBOKEN, NEW JERSEY, ASSIGNOR TO KEUFFEL & ESSER COMPANY, OF HOBOKEN, NEW JERSEY, A CORPORATION OF NEW JERSEY.

SLIDE-RULE RUNNER.

1,150,771.   Specification of Letters Patent.   Patented Aug. 17, 1915.

Application filed November 25, 1913, Serial No. 802,909. Renewed July 20, 1915. Serial No. 41,016.

*To all whom it may concern:*

Be it known that I, WILLIE L. E. KEUFFEL, a citizen of the United States, residing at Hoboken, in the county of Hudson and State of New Jersey, have invented certain new and useful Improvements in Slide-Rule Runners, of which the following is a specification.

This invention relates to runners for slide rules and its novelty consists in the construction and adaptation of the parts, as will be more fully hereinafter pointed out.

The slide rule runners now used in the art comprise usually a frame-work having longitudinal members adapted to engage the opposite longitudinal edges of the rule and transverse members joining such longitudinal members to form a frame, in which is set a pane of glass. The frame is usually made of metal and is consequently opaque, and one of the most irritating things about using a slide rule has been to find that when the slide has been set and the runner has been slid to the proper position, the graduations which it is desired to read are under one of the transverse opaque frame members and cannot be read without moving the runner, which, by shifting the sighting line on the runner, is apt to lead to an inaccurate reading. It has long been desirable to overcome this difficulty. A slide rule runner is a small simple device, and it would seem comparatively easy to accomplish the purpose, but although slide rules with runners have been in universal use by engineers for more than forty years, and the annoying defect referred to has been complained of many times, it has not heretofore been remedied.

The object of my invention is to remedy such defect, and I accomplish it by removing the transverse opaque side frames from the runner and extending the transparent panel beyond the longitudinal edges of the rule and there connecting it with the longitudinal frame members whereby an uninterrupted clear space is provided all the way across the rule and without anything to interfere with the view of the graduations on the rule, either immediately beneath the runner or elsewhere. This construction absolutely overcomes the disadvantage referred to, while it provides a runner equally efficient in all other respects.

In the drawings, Figure 1 is a side view of a slide rule and runner embodying my invention and Fig. 2 is a transverse section of the same on the plane of the line 2—2 in Fig. 1. Fig. 3 is a side view of a slide rule and runner, the runner being provided with two transparent panels, and Fig. 4 is a transverse section of the same.

In the drawings there are shown slide rules of usual form, each comprising a rule 10 and slide 11, and each longitudinally graduated as indicated at 12, only a small portion of such graduations being shown to avoid confusion. There is provided with each rule a runner, each runner embodying the invention but including a slightly different construction.

In Figs. 1 and 2 the runner comprises a front transparent panel 15 projecting beyond the longitudinal edges of the rule on each side as indicated at 16 and 17, and to which edges are secured respectively, by means of screws 21, longitudinal frame members 18 and 19, each having reëntrant flanges 20 adapted slidably to engage slots in the rule provided to receive them. A usual leaf spring 30 is provided to hold the runner in place after adjustment.

In Figs. 3 and 4 the runner comprises a front transparent panel 15 projecting beyond the longitudinal edges of the rule on each side as indicated at 16 and 17, and to which edges are secured respectively by means of screws 21 longitudinal frame members 18 and 19. It further comprises a rear transparent panel 150 also projecting beyond the opposite edges of the rule on each side as indicated at 160 and 170 and to which edges the longitudinal frame members 18 and 19 are secured by screws 210.

It will be understood that modifications may be made in the proportion, size and material of the parts within the principle of the invention.

What I claim is:

1. A slide rule runner comprising spaced guide devices for slidably engaging opposite edges of a rule, a transverse transparent panel extending across the space between the guide devices, and devices securing the margins of the panel directly to the guide devices, said panel constituting a connection between the guide devices that hold them in position.

2. A slide rule runner comprising spaced guide devices for slidably engaging opposite edges of a rule, spaced transparent panels extending across the space between the guide devices and over their opposite faces, and means securing the panels directly to the guide devices, said transparent panels constituting connections between the guide devices for holding said guide devices in position.

In testimony whereof I affix my signature in presence of two witnesses.

WILLIE L. E. KEUFFEL.

Witnesses:
   OTTO FREUND, JR.,
   BOWDERSINE B. VAN SICKLE.